(12) United States Patent
Yeh et al.

(10) Patent No.: US 9,729,243 B2
(45) Date of Patent: Aug. 8, 2017

(54) OPTOELECTRONIC TRANSMITTER, OPTOELECTRONIC RECEIVER AND OPTOELECTRONIC TRANSCEIVER

(71) Applicant: Centera Photonics Inc., Hsinchu (TW)

(72) Inventors: Tzu-Ching Yeh, Hsinchu County (TW); Hsiao-Chin Lan, New Taipei (TW); Chin-Ta Chen, Changhua County (TW); Po-Kuan Shen, Miaoli County (TW)

(73) Assignee: Centera Photonics Inc., Hsinchu (TW)

( * ) Notice: Subject to any disclaimer, the term of this patent is extended or adjusted under 35 U.S.C. 154(b) by 190 days.

(21) Appl. No.: 14/693,891

(22) Filed: Apr. 23, 2015

(65) Prior Publication Data

US 2016/0315710 A1    Oct. 27, 2016

(51) Int. Cl.
| | |
|---|---|
| *H04B 10/00* | (2013.01) |
| *H04B 10/50* | (2013.01) |
| *H04B 10/60* | (2013.01) |
| *H04B 10/40* | (2013.01) |
| *H04B 10/25* | (2013.01) |
| *G02B 6/00* | (2006.01) |
| *H04J 14/00* | (2006.01) |

(52) U.S. Cl.
CPC ............ *H04B 10/503* (2013.01); *G02B 6/00* (2013.01); *H04B 10/2504* (2013.01); *H04B 10/40* (2013.01); *H04B 10/506* (2013.01); *H04B 10/60* (2013.01)

(58) Field of Classification Search
CPC ...... G02B 6/42; G02B 6/4202; G02B 6/4203; G02B 6/4204; G02B 6/4212; G02B 6/4215; G02B 6/4246; G02B 6/4249; G02B 6/425; G02B 6/4287
See application file for complete search history.

(56) References Cited

U.S. PATENT DOCUMENTS

| | | | | |
|---|---|---|---|---|
| 2008/0089688 A1* | 4/2008 | Bai | ................. | G02B 6/12019 398/82 |
| 2012/0051694 A1* | 3/2012 | Russert | ................ | G02B 6/4249 385/33 |
| 2013/0084039 A1* | 4/2013 | Doany | .................... | G02B 6/32 385/33 |
| 2013/0121651 A1 | 5/2013 | Takahashi et al. | | |

FOREIGN PATENT DOCUMENTS

WO        2014041821        3/2014

\* cited by examiner

*Primary Examiner* — Daniel Dobson
(74) *Attorney, Agent, or Firm* — Jianq Chyun IP Office (57) ABSTRACT

An optoelectronic transmitter including a semiconductor substrate, at least one laser source, and a high numerical aperture (NA) waveguide is provided. The laser source is disposed on the semiconductor substrate and configured to emit at least one laser beam. The high numerical aperture (NA) waveguide has an NA greater than or equal to 0.5 and is disposed on the semiconductor substrate. At least a part of the laser beam from the laser source enters the high NA waveguide, wherein no lens is disposed on the light path of the laser beam between the laser source and the high NA waveguide. An optoelectronic receiver and an optoelectronic transceiver are also provided.

28 Claims, 6 Drawing Sheets

OPTOELECTRONIC TRANSMITTER, OPTOELECTRONIC RECEIVER AND OPTOELECTRONIC TRANSCEIVER

BACKGROUND OF THE INVENTION

1. Field of the Invention

The invention relates to an optoelectronic device and, in particular, to an optoelectronic transmitter, an optoelectronic receiver, and an optoelectronic transceiver.

2. Description of Related Art

In recent years, with great advance in the optoelectronic products development, semiconductor process is now widely used in fabricating all kinds of optoelectronic modules. Its advancement is also towards smaller size, higher integrity and multiple functions. The optoelectronic modules having been fabricated using the semiconductor process include charge coupled device (CCD), CMOS image sensor (CIS), solar cell, bio-chip or other similar devices.

In order to transmit light between light guide device such as fiber, waveguide, etc. and optoelectronic devices such as laser, light emitting diode (LED), photodiode, etc., the light guide devices and the optoelectronic devices of the optoelectronic modules need to be aligned precisely so as to perform the following packaging process. Currently, the process for fabricating optoelectronic modules is performed on each chip and the alignment of optoelectronic modules is performed under microscopes with specific fixtures. The manufacturing process is inefficient and wasteful in production capacity.

Moreover, when the chip and the light guide device are coupled, lenses are usually used to transmit light between the chip and the light guide device, which causes the optoelectronic module to have a larger size, be complicated, and be hard to perform alignment.

SUMMARY OF THE INVENTION

Accordingly, the invention is directed to an optoelectronic transmitter, which has a simplified structure and small size.

The invention is directed to an optoelectronic receiver, which has an integrated structure and small size.

The invention is directed to an optoelectronic transceiver, which has a simplified structure and small size.

According to an embodiment of the invention, an optoelectronic transmitter including a semiconductor substrate, at least one laser source, and a high numerical aperture (NA) waveguide is provided. The laser source is disposed on the semiconductor substrate and configured to emit at least one laser beam. The high numerical aperture (NA) waveguide has an NA greater than or equal to 0.5 and is disposed on the semiconductor substrate. At least a part of the laser beam from the laser source is transmitted into the high NA waveguide directly without penetrating a lens disposed between the laser source and the high NA waveguide.

According to an embodiment of the invention, an optoelectronic receiver including a semiconductor substrate, a beam splitter, a plurality of light guides, and a plurality of photodetectors. The beam splitter is disposed or formed on the semiconductor substrate and configured to divide a mixed signal beam into a plurality of sub-beams. The light guides are disposed on paths of the sub-beams, respectively, and disposed on the semiconductor substrate. The photodetectors are disposed on the paths of the sub-beams, respectively, and disposed on the semiconductor substrate, wherein the sub-beams from the beam splitter are transmitted into the photodetectors through the light guides, respectively.

According to an embodiment of the invention, an optoelectronic transceiver including the aforementioned optoelectronic transmitter and the aforementioned optoelectronic receiver is provided. The optoelectronic receiver is disposed beside the optoelectronic transmitter.

In the optoelectronic transmitter and the optoelectronic transceiver according to the embodiments of the invention, since a high numerical aperture (NA) waveguide having an NA greater than or equal to 0.5 is adopted, and since no lens is disposed on the light path of the laser beam between the laser source and the high NA waveguide, the optoelectronic transmitter and the optoelectronic transceiver have simplified structures and small sizes. In the optoelectronic receiver and the optoelectronic transceiver according to the embodiments of the invention, since the beam splitter, the light guides, and the photodetectors are integrated on the semiconductor substrate, the optoelectronic receiver and the optoelectronic transceiver have integrated structures and small sizes.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1A:
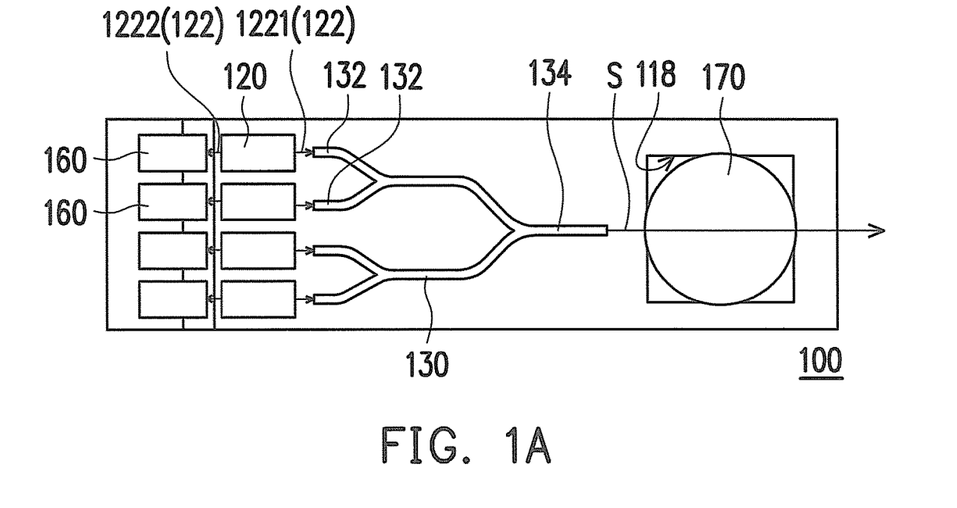
FIG. 1A is a schematic top view of an optoelectronic transmitter according to an embodiment of the invention.
Figure 1B:
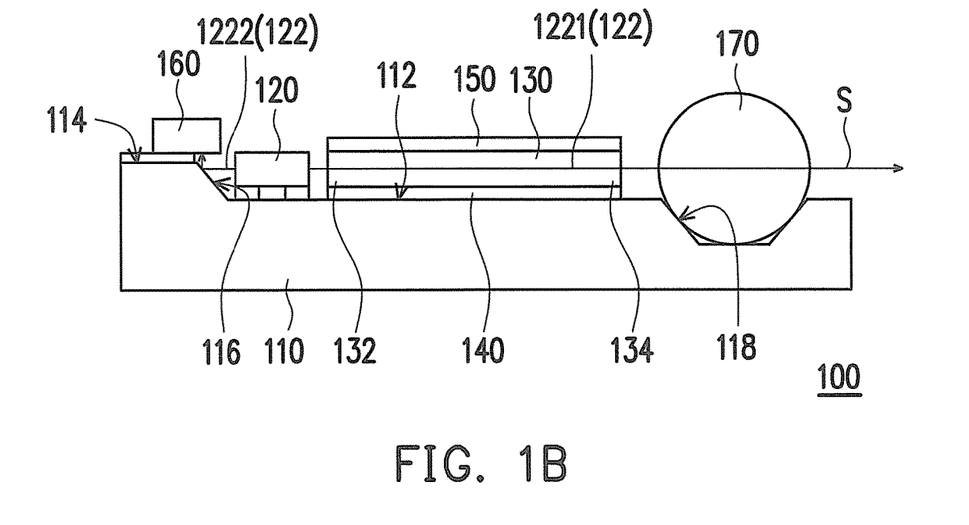
FIG. 1B is a schematic cross-sectional view of the optoelectronic transmitter in FIG. 1A.

FIG. 1A is a schematic top view of an optoelectronic transmitter according to an embodiment of the invention, and FIG. 1B is a schematic cross-sectional view of the optoelectronic transmitter in FIG. 1A. Referring to FIGS. 1A and 1B, the optoelectronic transmitter 100 in this embodiment includes a semiconductor substrate 110, at least one laser source 120, and a high numerical aperture (NA) waveguide 130. The laser source 120 is disposed on the semiconductor substrate 110 and configured to emit at least one laser beam 122. In this embodiment, the optoelectronic transmitter 100 includes a plurality of laser sources 120 respectively emitting a plurality of laser beams 122. The high numerical aperture (NA) waveguide 130 has an NA greater than or equal to 0.5 and is disposed on the semiconductor substrate 110. At least a part of the laser beam 122 (e.g., a first part 1221 of the laser beam 122) from the laser source 120 enters the high NA waveguide 130. In an embodiment of the present invention, the laser beam is transmitted into the high NA waveguide 130 directly without penetrating a lens disposed between the laser source 120 and the high NA waveguide 130.

In the optoelectronic transmitter 100 according to this embodiment, for adopting the high numerical aperture (NA) waveguide 130, saving lenses disposed between the laser source 120 and the high NA waveguide 130, the optoelectronic transmitter 100 has a simplified structure and small size. Specifically, since the high NA waveguide 130 has the high NA, the laser beam 122 from the laser source 120 may directly input the high NA waveguide 130 without being condensed by a lens.

In one embodiment, the laser source 120 may be a directly modulated laser, but the invention is not limited thereto. Moreover, in this embodiment, the optoelectronic transmitter 100 further includes a cladding layer 150 and a cladding layer 140 which is disposed between the high NA waveguide 130 and the semiconductor substrate 110. The high NA waveguide 130 is disposed between the cladding layer 140 and the cladding layer 150. The materials of the high NA waveguide 130 and the cladding layers 140 and 150 may include silicon, silicon nitride, silicon oxide, a combination thereof, or a multi-layer consisting thereof, and the refractive index of the high NA waveguide 130 is different from that of each of the cladding layers 140 and 150.

In one embodiment, the semiconductor substrate 110 has a first disposition surface 112, a second disposition surface 114, and a reflective surface 116 tilted in a 35-55, and preferred 45, degree angle and connecting the first disposition surface 112 and the second disposition surface 114. The laser source 120 and the high NA waveguide 130 are disposed on the first disposition surface 112. In one embodiment, the optoelectronic transmitter 100 further includes at least one optical detector 160 (a plurality of optical detectors 160 are exemplarily shown in FIG. 1A) used as a monitor photo detector (MPD) disposed on the second disposition surface 114, which can detect the intensity of laser beam 1222 transmitted from the laser source 120 and reflected by the reflective surface 116. The optical detector 160 is configured to monitor the power of the laser source 120, so as to ensure that the user safely uses the optoelectronic transmitter 100.

In this embodiment, the high NA waveguide 130 includes a plurality of branches 132, and laser beams 122 emitted from the laser sources 120 enter the branches 132, respectively. In one embodiment, the branches 132 finally combine into a single light emitting end 134 of the high NA waveguide 130, and the laser beams 122 transmitted through the branches 132 are combined into a mixed signal beam S and outputted from the light emitting end 134. Moreover, in one embodiment, the optoelectronic transmitter 100 further includes a lens 170 disposed on a light path of the mixed signal beam S from the light emitting end 134. The lens 170 may condense the mixed signal beam S into a fiber, so that the mixed signal beam S may be transmitted outwards through the fiber, and in one embodiment, such fiber can be a kind of lens fiber having a rounding terminal functioning as a lens. The lens fiber can collect more signal beam S from lens 170 through the rounding terminal. In another embodiment, the lens 170 can be omitted, and the mixed signal beam S is transmitted into the lens fiber directly.

In one embodiment, the semiconductor substrate 110 is a silicon substrate, and has a recess 118 to fix the lens 170. Through the semiconductor process, the reflective surface 116 and the recess 118 have high accuracy, so that the lens 170 may be precisely fixed on the semiconductor substrate 110. As a result, the alignment of the laser source 120, the high NA waveguide 130, and the lens 170 is easier, and may be performed without any microscope. In this embodiment, the reflective surface 116 is inclined with respect to the first and second disposition surfaces 112 and 114 by 45 degrees.

Figure 2:
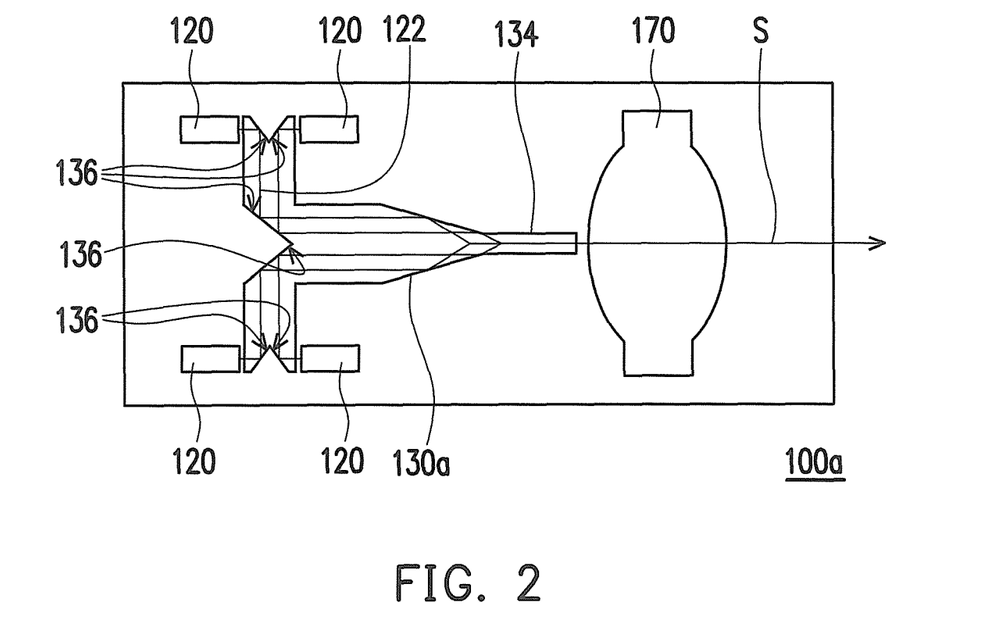
FIG. 2 is a schematic top view of an optoelectronic transmitter according to another embodiment of the invention.

FIG. 2 is a schematic top view of an optoelectronic transmitter according to another embodiment of the invention. Instead of directly transmitted into the high NA waveguide 130 in FIGS. 1A and 1B, the laser beam 122 in FIG. 2 is reflected by a mirror structure before transmitted through the waveguide 130a. As shown in FIG. 2, the high NA waveguide 130a includes a plurality of reflective surfaces 136 as a mirror structure. Laser beams 122 are emitted from the laser sources 120 and reflected by the reflective surfaces 136, then combined into a mixed signal beam S and outputted from the light emitting end 134 of the high NA waveguide 130a.

Figure 3:
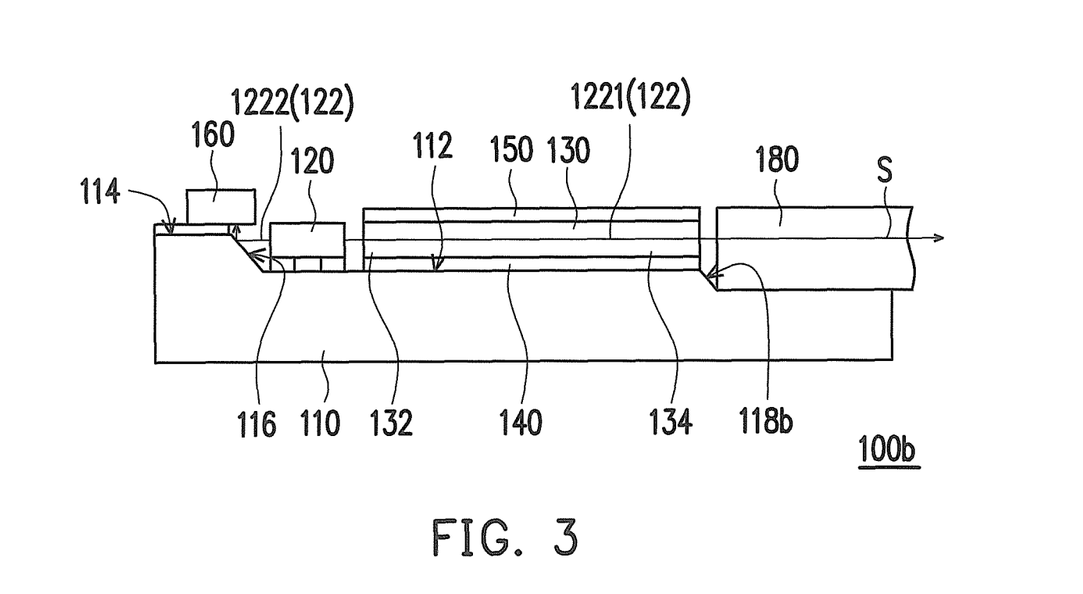
FIG. 3 is a schematic cross-sectional view of an optoelectronic transmitter according to another embodiment of the invention.

In another embodiment of the invention, the lens 170 in FIGS. 1A, 1B, and 2 is optional and thus can be omitted. FIG. 3 is a schematic cross-sectional view of an optoelectronic transmitter according to another embodiment of the invention, showing that the mixed signal beam S from the high NA waveguide 130 is transmitted to the fiber 180 without passing through any lens. In one embodiment, the fiber 180 is fixed or formed in a recess 118b of the substrate 110. And in another embodiment, the fiber 180 is a lens fiber.

Figure 4:
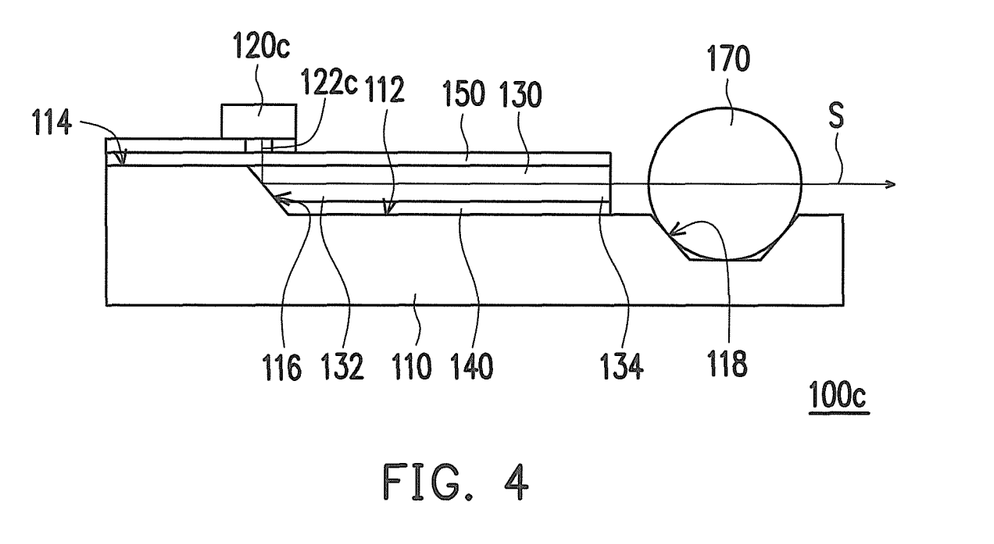
FIG. 4 is a schematic cross-sectional view of an optoelectronic transmitter according to another embodiment of the invention.

FIG. 4 is another embodiment of the invention. Rather than disposed on the first surface 112 in FIG. 1A, the laser source 120c is disposed on the second disposition surface 114. In one embodiment, the laser source 120c extrudes from the second disposition surface 114 and covers at least a portion of the reflective surface 116. The laser beam 122c emitted from the laser source 120c is reflected to the high NA waveguide 130 by the reflective surface 116. In one embodiment, the laser source 120c is a vertical cavity surface emitting laser (VCSEL), which emits laser beam 122c towards the reflective surface 116.

Figure 5A:
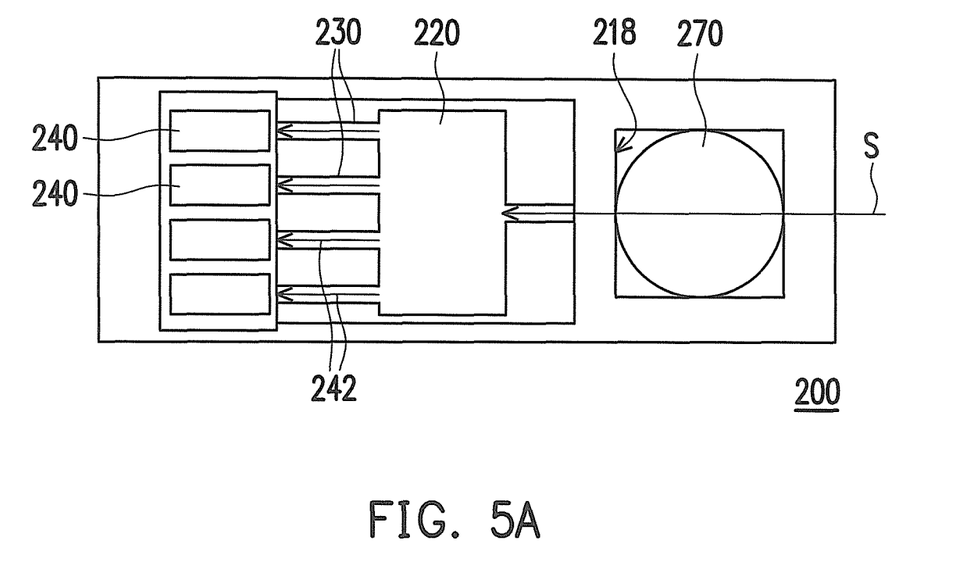
FIG. 5A is a schematic top view of an optoelectronic receiver according to an embodiment of the invention.
Figure 5B:
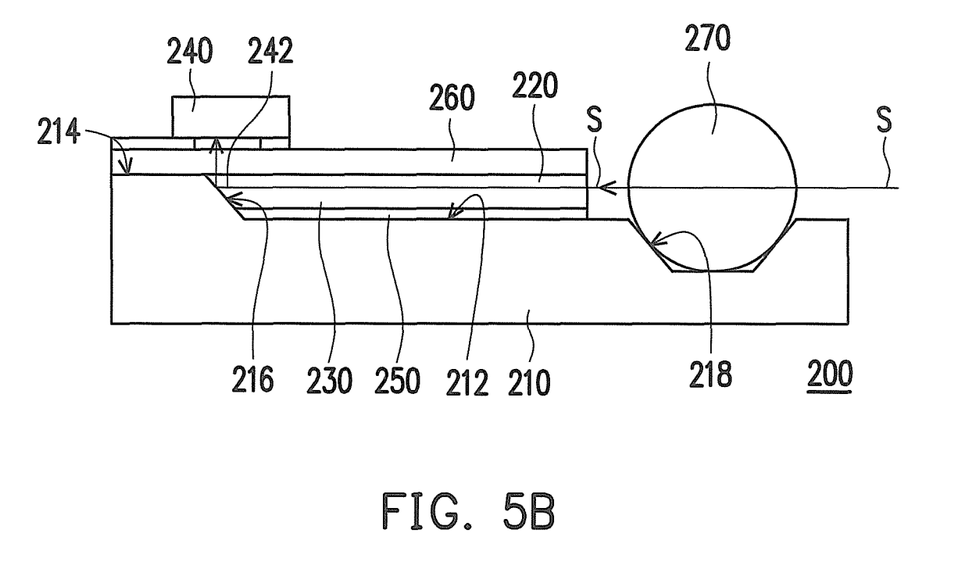
FIG. 5B is a schematic cross-sectional view of the optoelectronic receiver in FIG. 5A.

FIG. 5A is a schematic top view of an optoelectronic receiver according to an embodiment of the invention, and FIG. 5B is a schematic cross-sectional view of the optoelectronic receiver in FIG. 5A. Referring to FIGS. 5A and 5B, the optoelectronic receiver 200 includes a semiconductor substrate 210, a beam splitter 220, a plurality of light guides 230, and a plurality of photodetectors 240. In one embodiment, the beam splitter 220 is an arrayed waveguide grating (AWG) disposed or formed on the semiconductor substrate 210 and configured to divide a mixed signal beam S into a plurality of sub-beams 242 which is then transmitted into the corresponding photodetectors 240 through the light guides 230, respectively, disposed on the semiconductor substrate 210.

Since the beam splitter 220, the light guides 230, and the photodetectors 240 are integrated on the semiconductor substrate 210, the optoelectronic receiver 200 has an integrated structure and small size.

In one embodiment, the optoelectronic receiver 200 further includes a cladding layers 250 and 260 disposed on and beneath the beam splitter 220 respectively. The refractive indexes of the beam splitter 220 and 230 are different from those of the cladding layer 250 and 260, and in one embodiment, the refractive indexes of the beam splitter 220 and 230 are different.

In this embodiment, the semiconductor substrate 210 has a first disposition surface 212, a second disposition surface 214, and a reflective surface 216 tilted in a 35-55, and preferred 45, degree angle and connecting the first disposition surface 212 and the second disposition surface 214. The photodetector 240 is disposed on the second disposition surface 214. In one embodiment, the photodetector 240 extrudes from the second disposition surface 214 and covers at least a portion of the reflective surface 216. The sub-beams 242 transmitted from the light guides 230 are reflected to the photodetector 240 and then received by the photodetector 240.

In one embodiment, the optoelectronic receiver 200 further includes a lens 270 configured to receive the mixed signal beam S and transmit the mixed signal beam S to the beam splitter 220. In one embodiment, the semiconductor substrate 210 is a silicon substrate. The semiconductor substrate 210 may have a recess 218 to fix the lens 270. Through the semiconductor process, the reflective surface 216 and the recess 218 have high accuracy, so that the lens 270 may be precisely fixed by the semiconductor substrate 210. As a result, the alignment of the photodetectors 240, the light guides 230, the beam splitter 220, and the lens 270 is easier, and may be fabricated without any microscope.

Figure 6A:
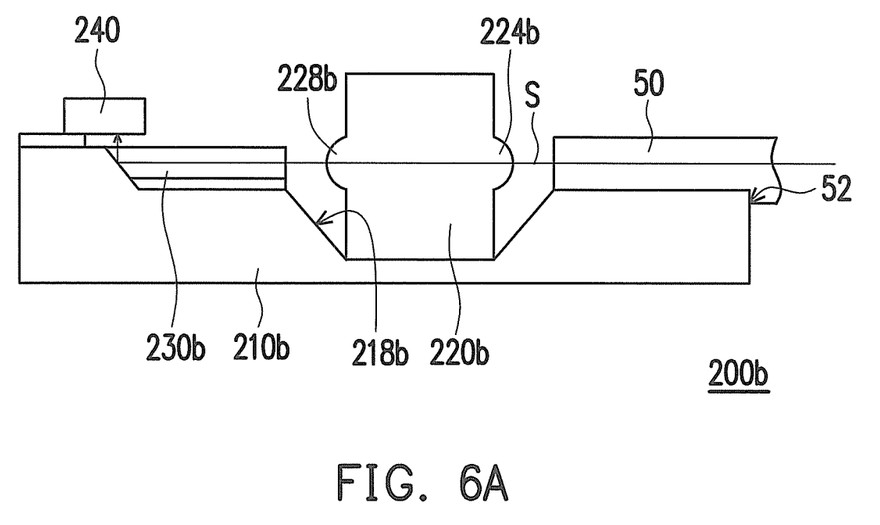
FIG. 6A is a schematic cross-sectional view of an optoelectronic receiver according to another embodiment of the invention.
Figure 6B:
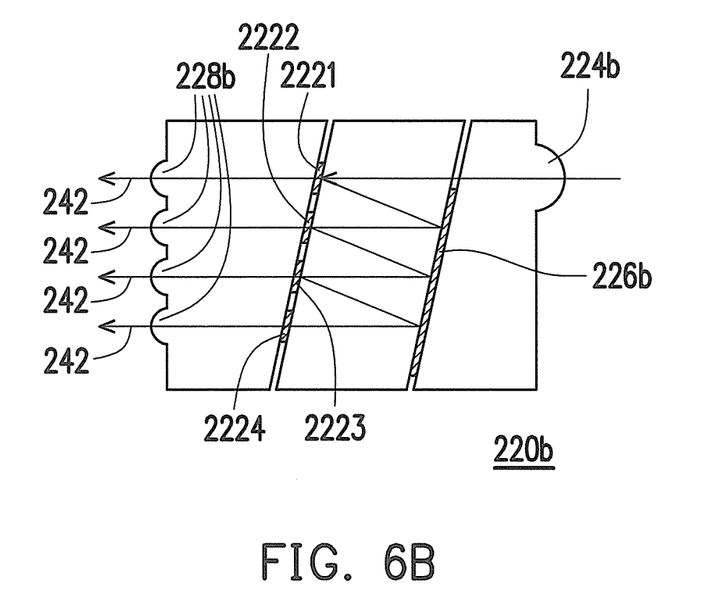
FIG. 6B is a schematic top view of the beam splitter 220 in FIG. 6A.
Figure 6C:
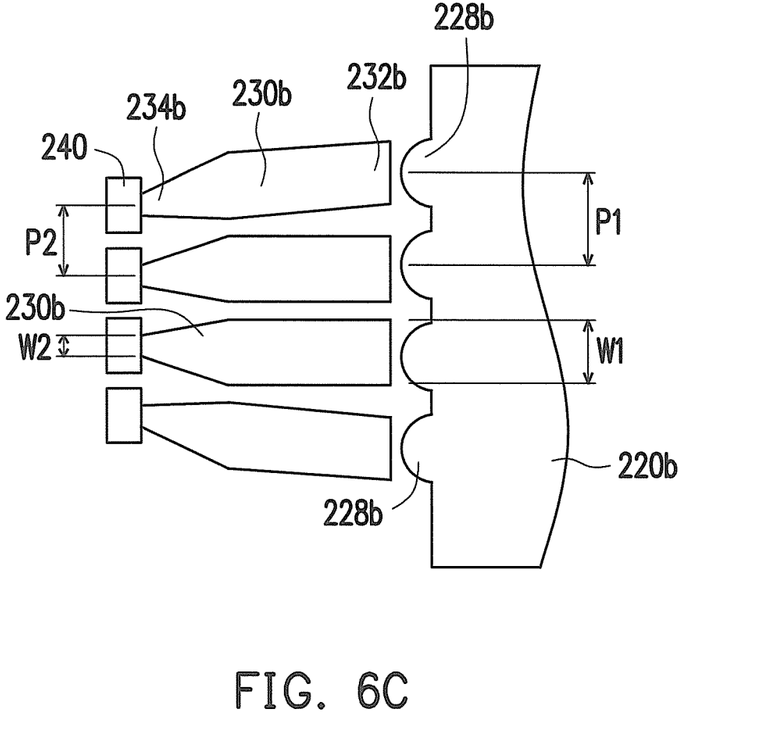
FIG. 6C is a schematic top view of the photodetectors, the light guides, and a part of the beam splitter in FIG. 6A.

FIG. 6A is a schematic cross-sectional view of an optoelectronic receiver according to another embodiment of the invention, FIG. 6B is a schematic top view of the beam splitter 220 in FIG. 6A, and FIG. 6C is a schematic top view of the photodetectors, the light guides, and a part of the beam splitter in FIG. 6A. In this embodiment, replacing the lens 270 in FIG. 5A, the beam splitter 220b in FIGS. 6A and 6B includes a plurality of filters 2221-2224 configured to split the mixed signal beam S into the sub-beams 242 in sequence. In one embodiment, the filters 2221-2224 may be a translucent mirror which can pass the light of a certain range of the wavelength and reflect the light of the other range of the wavelength. In another embodiment, the filters have the same characteristics as color filters or dichroic filters.

Specifically, the beam splitter 220b includes a collimator lens 224b, and the mixed signal beam S from a fiber 50, e.g., a single mode fiber, enters the beam splitter 220b through the collimator lens 224b. In another embodiment, the fiber 50 can be a lens fiber. The filter 2221 in FIG. 6B then filters the mixed signal beam S, passing a certain wavelength range as a sub-beam 242 and reflecting the other part of the mixed signal beam S of the other wavelength range. Next, a reflector 226b reflects the other part of the mixed signal beam S with the other wavelength to the filter 2222. Similarly, through the other filters 2222, 2223, and 2224, the respective sub-beams 242 with different wavelength range can be separated in sequence. In one embodiment, the split sub-beams 242 from the individual filters 2221-2224 pass through a plurality of focus lenses 228b of the beam splitter 220b, and is then transmitted to the light guides 230b.

In the embodiment, the semiconductor substrate 210b has a recess 218b to fix the beam splitter 220b, so that the beam splitter 220b may be passively aligned with the light guides 230b.

In one embodiment, each of the light guides 230b has a light input end 232b adjacent to the beam splitter 220b and a light output end 234b adjacent to one of the photodetectors 240, and the pitch P1 of the light input ends 232b is greater than the pitch P2 of the light output ends 234b. Moreover, in one embodiment, the width W1 of the light input end 232b may be greater than the width W2 of the light output end 234b. In summary, instead of the high accuracy of alignment to package the optoelectronic product having plural lens and mirror sets, the embodiments of the present invention provide more flexible method and structure to guide the light beam.

In this embodiment, the semiconductor substrate 210b may further includes a recess 52 to fix the fiber 50. As a result, the fiber 50 may be passively aligned with the beam splitter 220b.

Figure 7:
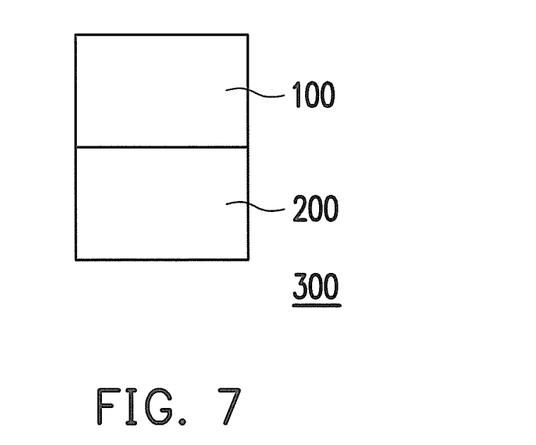
FIG. 7 is a schematic view of an optoelectronic transceiver according to an embodiment of the invention.

FIG. 7 is a schematic view of an optoelectronic transceiver according to an embodiment of the invention. Referring to FIGS. 1B, 5B, and 7, an optoelectronic transceiver 300 in this embodiment includes the aforementioned optoelectronic transmitter 100 in FIG. 1B and the aforementioned optoelectronic receiver 200 in FIG. 5B. The optoelectronic receiver 200 is disposed beside the optoelectronic transmitter 300. In some embodiments, the semiconductor substrate 110 of the optoelectronic transmitter 100 and the semiconductor substrate 210 of the optoelectronic receiver 200 may be integrally formed; that is, the semiconductor substrate 110 and the semiconductor substrate 210 are integrated into a single substrate. However, in some other embodiments, the semiconductor substrate 110 and the semiconductor substrate 210 may be individually formed; that is, the semiconductor substrate 110 and the semiconductor substrate 210 are two substrates.

In some embodiments, any of the optoelectronic transmitters 100, 100a, 100b, and 100c may be integrated with any of the optoelectronic receivers 200 and 200b to form an optoelectronic transceiver. As a result, the optoelectronic transceiver may have both the advantage of any of the optoelectronic transmitters 100, 100a, 100b, and 100c and the advantage of any of the optoelectronic receivers 200 and 200b.

In conclusion, in the optoelectronic transmitter and the optoelectronic transceiver according to the embodiments of the invention, since a high numerical aperture (NA) waveguide having an NA greater than or equal to 0.5 is adopted, and since no lens is disposed on the light path of the laser beam between the laser source and the high NA waveguide, the optoelectronic transmitter and the optoelectronic transceiver have simplified structures and small sizes. In the optoelectronic receiver and the optoelectronic transceiver according to the embodiments of the invention, since the beam splitter, the light guides, and the photodetectors are integrated on the semiconductor substrate, the optoelectronic receiver and the optoelectronic transceiver have integrated structures and small sizes.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:
1. An optoelectronic transmitter comprising:
a semiconductor substrate;

at least one laser source disposed on the semiconductor substrate and configured to emit at least one laser beam; and a high numerical aperture (NA) waveguide having an NA greater than or equal to 0.5 and disposed on the semiconductor substrate, at least a part of the laser beam from the laser source being transmitted into the high NA waveguide directly without penetrating a lens disposed between the laser source and the high NA waveguide.

2. The optoelectronic transmitter according to claim 1, wherein the at least one laser source is a plurality of laser sources, the high NA waveguide comprises a plurality of branches, and laser beams emitted from the laser sources enter the branches, respectively.

3. The optoelectronic transmitter according to claim 2, wherein the branches combine into a single light emitting end of the high NA waveguide, and the laser beams transmitted through the branches are combined into a mixed signal beam and outputted from the light emitting end.

4. The optoelectronic transmitter according to claim 3 further comprising a lens disposed on a light path of the mixed signal beam from the light emitting end.

5. The optoelectronic transmitter according to claim 3 further comprising a lens fiber disposed on a light path of the mixed signal beam from the light emitting end.

6. The optoelectronic transmitter according to claim 1, wherein the at least one laser source is a plurality of laser sources, the high NA waveguide comprises a plurality of reflective surfaces, and laser beams are emitted from the laser sources and reflected by the reflective surfaces, then combined into a mixed signal beam and outputted from a light emitting end of the high NA waveguide.

7. The optoelectronic transmitter according to claim 1, wherein the semiconductor substrate has a first disposition surface, a second disposition surface, and a reflective surface connecting the first disposition surface and the second disposition surface, the laser source and the high NA waveguide are disposed on the first disposition surface, the reflective surface is inclined with respect to the first disposition surface and the second disposition surface, the optoelectronic transmitter further comprises at least one optical detector disposed on the second disposition surface, and another part of the laser beam from the laser source is reflected to the optical detector by the reflective surface.

8. The optoelectronic transmitter according to claim 1, wherein the semiconductor substrate has a first disposition surface, a second disposition surface, and a reflective surface connecting the first disposition surface and the second disposition surface, the high NA waveguide is disposed on the first disposition surface, the reflective surface is inclined with respect to the first disposition surface and the second disposition surface, the laser source is disposed on the second disposition surface, and the laser beam emitted from the laser source is reflected to the high NA waveguide by the reflective surface.

9. The optoelectronic transmitter according to claim 1, wherein the semiconductor substrate is a silicon substrate.

10. An optoelectronic receiver comprising:
a semiconductor substrate;
a beam splitter disposed or formed on the semiconductor substrate and configured to divide a mixed signal beam into a plurality of sub-beams;
a plurality of light guides disposed on paths of the sub-beams, respectively, and disposed on the semiconductor substrate; and a plurality of photodetectors disposed on the paths of the sub-beams, respectively, and disposed on the semiconductor substrate, wherein the sub-beams from the beam splitter are transmitted into the photodetectors through the light guides, respectively, wherein the beam splitter comprises a plurality of filters configured to respectively split the mixed signal beam into the sub-beams in sequence.

11. The optoelectronic receiver according to claim 10, wherein the beam splitter is an arrayed waveguide grating.

12. The optoelectronic receiver according to claim 10, wherein the semiconductor substrate has a first disposition surface, a second disposition surface, and a reflective surface connecting the first disposition surface and the second disposition surface, the beam splitter and the light guides are disposed on the first disposition surface, the reflective surface is inclined with respect to the first disposition surface and the second disposition surface, the photodetectors are disposed on the second disposition surface, the sub-beams transmitted from the light guides are reflected to the photodetectors and then received by the photodetector.

13. The optoelectronic receiver according to claim 10, wherein each of the light guides has a light input end adjacent to the beam splitter and a light output end adjacent to one of the photodetectors, and a pitch of the light input ends is greater than a pitch of the light output ends.

14. The optoelectronic receiver according to claim 10 further comprising a lens configured to receive the mixed signal beam and transmit the mixed signal beam to the beam splitter.

15. The optoelectronic receiver according to claim 10, wherein the semiconductor substrate is a silicon substrate.

16. An optoelectronic transceiver comprising:
an optoelectronic transmitter comprising:
a first semiconductor substrate;
at least one laser source disposed on the first semiconductor substrate and configured to emit at least one laser beam; and
a high numerical aperture (NA) waveguide having an NA greater than or equal to 0.5 and disposed on the first semiconductor substrate, at least a part of the laser beam from the laser source being transmitted into the high NA waveguide directly without penetrating a lens disposed between the laser source and the high NA waveguide; and
an optoelectronic receiver disposed beside the optoelectronic transmitter and comprising:
a second semiconductor substrate;
a beam splitter disposed on the second semiconductor substrate and configured to divide a mixed signal beam into a plurality of sub-beams;
a plurality of light guides disposed on paths of the sub-beams, respectively; and
a plurality of photodetectors disposed on the paths of the sub-beams, respectively, wherein the sub-beams from the beam splitter are transmitted into the photodetectors through the light guides, respectively.

17. The optoelectronic transceiver according to claim 16, wherein the at least one laser source is a plurality of laser sources, the high NA waveguide comprises a plurality of branches, and laser beams emitted from the laser sources enter the branches, respectively.

18. The optoelectronic transceiver according to claim 17, wherein the branches combine into a single light emitting end of the high NA waveguide, and the laser beams transmitted through the branches are combined into a mixed signal beam and outputted from the light emitting end.

19. The optoelectronic transceiver according to claim 18, wherein the optoelectronic transmitter further comprises a lens disposed on a light path of the mixed signal beam from the light emitting end.

20. The optoelectronic transceiver according to claim 16, wherein the at least one laser source is a plurality of laser sources, the high NA waveguide comprises a plurality of reflective surfaces, and laser beams are emitted from the laser sources and reflected by the reflective surfaces, then combined into a mixed signal beam and outputted from a light emitting end of the high NA waveguide.

21. The optoelectronic transceiver according to claim 16, wherein the first semiconductor substrate has a first disposition surface, a second disposition surface, and a reflective surface connecting the first disposition surface and the second disposition surface, the laser source and the high NA waveguide are disposed on the first disposition surface, the reflective surface is inclined with respect to the first disposition surface and the second disposition surface, the optoelectronic transmitter further comprises at least one optical detector disposed on the second disposition surface, and another part of the laser beam from the laser source is reflected to the optical detector by the reflective surface.

22. The optoelectronic transceiver according to claim 16, wherein the first semiconductor substrate has a first disposition surface, a second disposition surface, and a reflective surface connecting the first disposition surface and the second disposition surface, the high NA waveguide is disposed on the first disposition surface, the reflective surface is inclined with respect to the first disposition surface and the second disposition surface, the laser source is disposed on the second disposition surface, and the laser beam emitted from the laser source is reflected to the high NA waveguide by the reflective surface.

23. The optoelectronic transceiver according to claim 16, wherein the first semiconductor substrate and the second semiconductor substrate are silicon substrates.

24. The optoelectronic transceiver according to claim 16, wherein the beam splitter is an arrayed waveguide grating.

25. The optoelectronic transceiver according to claim 16, wherein the second semiconductor substrate has a first disposition surface, a second disposition surface, and a reflective surface connecting the first disposition surface and the second disposition surface, the beam splitter and the light guides are disposed on the first disposition surface, the reflective surface is inclined with respect to the first disposition surface and the second disposition surface, the photodetectors are disposed on the second disposition surface, the sub-beams respectively entering the light guides are reflected to the photodetectors, respectively, by the reflective surface.

26. The optoelectronic transceiver according to claim 16, wherein the beam splitter comprises a plurality of filters configured to respectively filter the mixed signal beam into the sub-beams in sequence.

27. The optoelectronic transceiver according to claim 16, wherein each of the light guides has a light input end adjacent to the beam splitter and a light output end adjacent to one of the photodetectors, and a pitch of the light input ends is greater than a pitch of the light output ends.

28. The optoelectronic transceiver according to claim 16, wherein the optoelectronic receiver further comprises a lens configured to receive the mixed signal beam and transmit the mixed signal beam to the beam splitter.

* * * * *